United States Patent [19]
Gorr

[11] 4,261,306
[45] Apr. 14, 1981

[54] METHOD AND APPARATUS FOR IMPROVING PERFORMANCE OF TWO-CYCLE GASOLINE ENGINE

[76] Inventor: Eric D. Gorr, 27 N. Belmont, Arlington Heights, Ill. 60004

[21] Appl. No.: 114,757

[22] Filed: Jan. 24, 1980

[51] Int. Cl.³ ............................................. F02B 33/04
[52] U.S. Cl. ........................ 123/73 R; 123/73 A; 123/73 AC; 123/73 PP
[58] Field of Search ............. 123/73 A, 73 R, 73 PP, 123/73 AC, 73 S

[56] References Cited

U.S. PATENT DOCUMENTS

| | | | |
|---|---|---|---|
| 1,780,635 | 11/1930 | Spencer | 123/73 A |
| 2,477,374 | 7/1949 | Ide | 123/73 A |
| 2,547,327 | 4/1951 | King | 123/73 A |
| 2,822,793 | 2/1958 | Bellwinkel et al. | 123/73 R |
| 3,227,146 | 1/1966 | Drebes | 123/73 R |
| 3,604,403 | 9/1971 | Larson | 123/73 A |
| 3,695,240 | 10/1972 | Cookson | 123/73 A |
| 3,810,450 | 5/1974 | Woodhouse | 123/73 A |
| 3,916,851 | 11/1975 | Otani | 123/73 A |
| 4,176,631 | 12/1979 | Kanao | 123/73 PP |

*Primary Examiner*—Wendell E. Burns
*Attorney, Agent, or Firm*—Darbo & Vandenburgh

[57] ABSTRACT

The rotating combustible mixture in the crankcase of a two-cycle gasoline engine is scooped into the transfer duct leading to the cylinder by a plurality of vanes extending over the crankcase flywheel and in close juxtaposition thereto.

9 Claims, 3 Drawing Figures

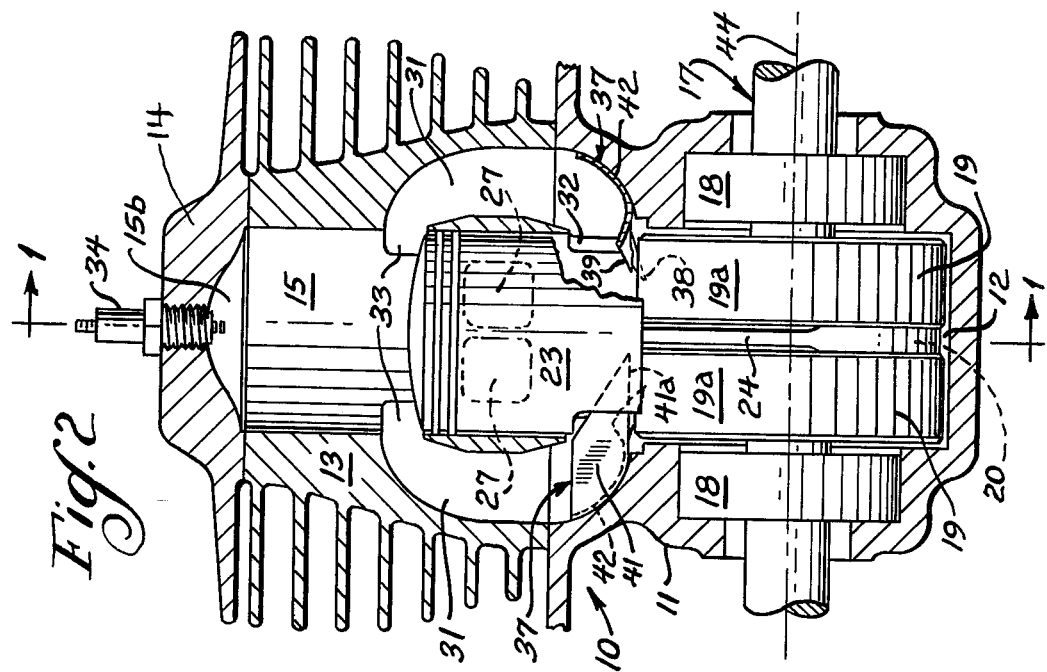
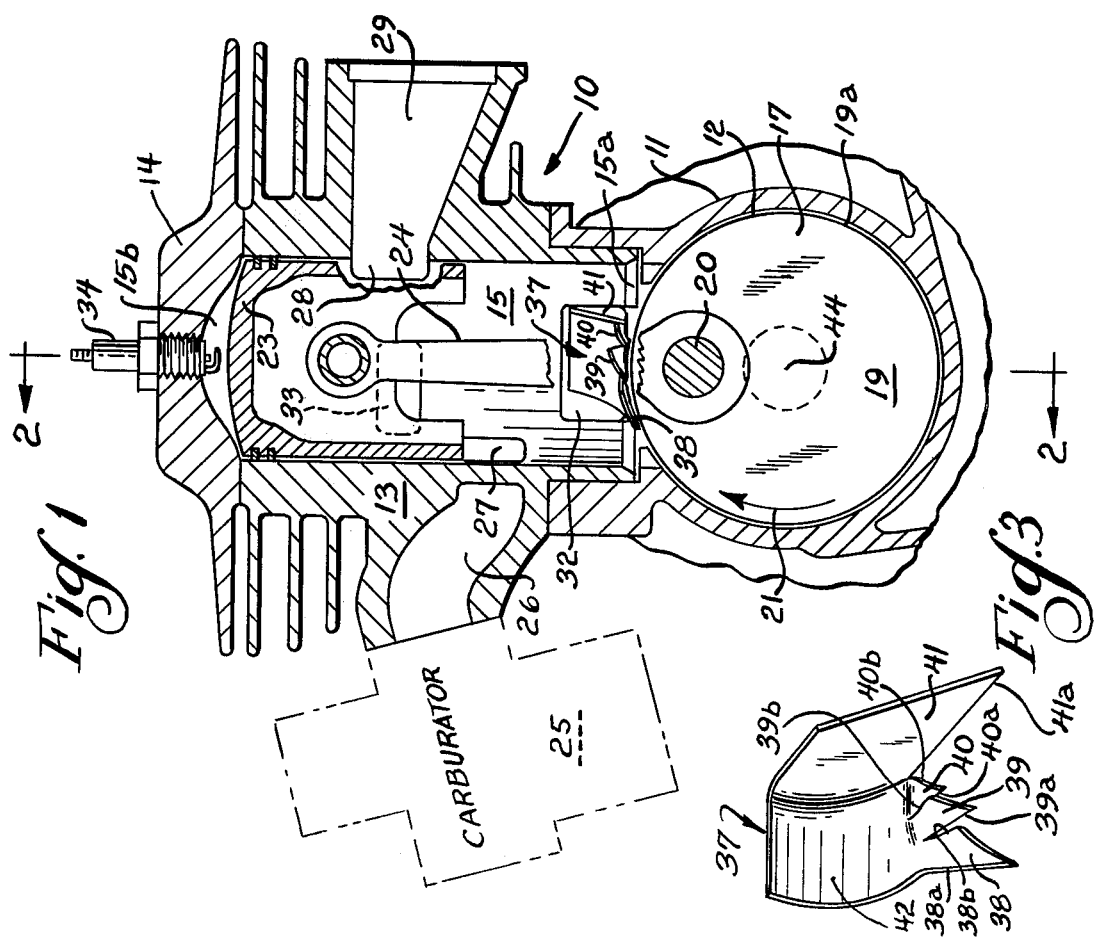

METHOD AND APPARATUS FOR IMPROVING PERFORMANCE OF TWO-CYCLE GASOLINE ENGINE

BACKGROUND AND SUMMARY OF THE INVENTION

In a two-cycle gasoline engine the combustible mixture flows into the cylinder at the crankcase side of the piston when the piston is adjacent the cylinder head. As the engine fires and the piston moves toward the crankcase, this combustible mixture then is compressed in the crankcase. When the piston approaches its extremity of travel closest to the crankcase, it uncovers a port in the cylinder wall, which port is a part of a transfer duct communicating with the crankcase. This allows the combustible mixture which has been compressed in the crankcase to flow into the cylinder, between the piston and the cylinder head. Of course, not all of the combustible mixture in the crankcase will be exhausted therefrom and into the cylinder. The principal object of the present invention is to improve the performance of the engine by increasing the amount of the combustible mixture that moves from the crankcase into the cylinder.

The rotation of the crankshaft in the crankcase acts much in the nature of a blower fan to cause a rotation in the same direction of the combustible mixture. This is all the more true in those two-cycle engines which have one or two cylindrical flywheels in the crankcase as a part of what may be referred to as the crankshaft. Furthermore, in these latter type of engines there is a "boundary layer" of the combustible mixture immediately adjacent the periphery of the flywheel(s) and rotating therewith at approximately the same speed as the flywheel(s). In the present invention, vanes are positioned in the crankcase to deflect this rotating air into the port forming the crankcase end of the transfer duct. In those engines having the flywheel in the crankcase, this vane structure is positioned immediately adjacent the periphery of the flywheel so that the boundary layer is skimmed or scooped from its position adjacent the flywheel periphery and directed toward the transfer duct. Thus in utilizing the present invention the charging of combustible mixture into the cylinder is accomplished not only as a result of the compression of the combustible mixture in the crankcase, but also as a result of the force occasioned by the rapidly moving (in a rotating direction) combustible mixture in the crankcase. Thus the power of a given two-cycle engine is increased due to the increased charge of combustible mixture in the cylinder.

DESCRIPTION OF THE DRAWINGS

FIG. 1 is a section through a representative two-cycle engine, the section being at right angles to the crankshaft, with portions broken away and other portions shown diagrammatically, and illustrating an embodiment of the invention as used therewith;

FIG. 2 is a section taken at line 2—2 of FIG. 1; and

FIG. 3 is an isometric view of the vane device as used in the engine of FIGS. 1 and 2.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

FIGS. 1 and 2 illustrate a two-cycle engine comprising a multicomponent engine body, generally 10. There is a base component 11 which defines a crankcase 12, a cylinder component 13 and a cylinder head 14, which together define the cylinder 15. The end 15a of the cylinder at the crankcase is open while the cylinder head forms a closed end 15b of the cylinder. A crankshaft, generally 17, is rotatably mounted by means of bearings 18 in the base component 11. The crankshaft includes a pair of flywheels 19 and a crankpin 20 connecting the flywheels. When the engine is running the crankshaft rotates in the direction indicated by arrow 21. A piston 23 reciprocates in cylinder 15 and is connected to the crankshaft by a connecting rod 24.

The combustible mixture for the engine is formed in a carburetor 25 and flows into the engine through an intake duct 26 which terminates in a pair of ports 27 in the cylinder wall. The exhaust gases of the engine flow from a port 28 in the cylinder wall out through an exhaust duct 29. There are two transfer ducts 31 which extend between intake, or crankcase transfer, ports 32 at the crankcase end of the cylinder and discharge ports 33 intermediate the two ends of the cylinder.

As thus far described, the engine is representative of a conventional two-cycle engine. With a combustible mixture in the end 15b of the cylinder and with the piston in the position illustrated in FIG. 1, a spark between the electrodes of the spark plug 34 will ignite that combustible mixture. The force created by that burning mixture drives the piston toward the position illustrated in FIG. 2, with the crankshaft turning in the direction indicated by arrow 21. When the moving piston starts uncovering port 28 the burned gases are allowed to escape through duct 29. The moving piston will also have covered intake port 27 so that the combustible mixture at the crankshaft side of the piston is compressed in the crankcase and the adjacent end of the cylinder. When the piston moves sufficiently far in the cylinder to uncover discharge port 33 that compressed mixture flows from the crankcase through intake ports 32, through the transfer ducts 31 and into the cylinder through discharge ports 33. As the piston again returns from the FIG. 2 position toward the FIG. 1 position it covers ports 33 and 28 and opens port 27. The opening of port 27 again permits the combustible mixture to flow from the carburetor 25 into the engine. The cycle is then repeated.

The rotation of the crankshaft 21 in the direction indicated by arrow 21 causes a rotation of the combustible mixture in the crankcase in the same direction. Immediately adjacent the peripheries 19a of the flywheels there is a "boundary layer" of the combustible mixture which seemingly almost adheres to the respective periphery. My invention is to utilize the force embodied in this rotating combustible mixture to additionally charge the cylinder of the engine. To do this I employ a vane device, generally 37, to scoop the boundary layer from the flywheel peripheries and to deflect the rotating combustible mixture into the intake ports 32 of the transfer ducts. The illustrated embodiment of this device comprises three scooping vanes 38–40, a deflector 41, and a curved mounting portion 42. The portion 42 is shaped to correspond to the shape of the transfer duct, as best seen in FIG. 2. The device may be secured in place in a variety of ways. I have followed the practice of affixing the device to the engine body by means of an epoxy resin adhesive.

Each of the vanes has, in the sense of the direction of movement of the rotating combustible mixture, a leading edge and a trailing edge, the leading edges being 38a, 39a and 40a, respectively, and the trailing edges being 38b, 39b and 40b, respectively. As best seen in FIG. 1, the leading edges of the vanes are immediately adjacent the peripheries 19a of the flywheels, while the trailing edges thereof are spaced at a greater distance from the flywheel. Thus these vanes serve to scoop the boundary layer from the location adjacent the flywheel periphery and deflect it toward the intake port 32. The deflector 42 is positioned approximately radially with respect to the axis 44 of rotation of the crankshaft. It has an edge 41a adjacent the periphery of the flywheel, with the remainder of the deflector extending from that edge in said approximately radial direction. This deflector serves to force the moving mixture into the respective intake port 32.

It will be apparent to those skilled in the art that the exact conformation of the device 37 will be tailored to match the physical characteristics of each type of two-cycle engine. The exact number and configuration of the vanes 38–40 can be determined empirically for particular engines, but the form illustrated has proven eminently suitable in my testing. The deflector 41 is not an absolute necessity, but I believe that it assists in improving engine performance. The point is to take advantage of the inertia of the moving combustible mixture in the crankcase and using it to force an additional charge of combustible mixture through the transfer ducts and into the cylinder.

I claim:

1. In a two-cycle gasoline engine comprising an engine body, a cylinder in the body and having a closed end and an open end, an enclosed crankcase in the body and communicating with said open end, a crankshaft extending through the crankcase and rotatably mounted therein, a piston reciprocatively mounted in the cylinder, a connecting rod connecting the piston and the crankshaft, an intake duct in the body and communicating with the cylinder and through which a combustible mixture enters said cylinder when said piston is adjacent said closed end, said piston driving said mixture into said crank-case as said piston returns toward said open end, an exhaust duct in the body and communicating with the cylinder, said body defining a transfer duct extending between a crankcase transfer port located immediately adjacent the crankcase and a discharge port located at about midway along the cylinder, the ports being located to be uncovered by the piston when the piston is at said open end whereby the mixture then flows from the crankcase through the transfer duct and into the cylinder, said crankshaft rotating in a given direction thereby causing the mixture in the crankcase to correspondingly rotate in the same direction, the improvement comprising:
vane means at said crankcase transfer port, secured to said body, and extending into said crankcase for directing rotating mixture in the crankcase toward and into said crankcase transfer port.

2. In an engine as set forth in claim 1, and wherein the crankshaft includes a flywheel in the crankcase which flywheel has a cylindrical periphery and wherein there is a rotating boundary layer of said mixture immediately adjacent said periphery, the further improvement comprising:
said vane means including a plurality of individual vanes, each vane having a leading edge and a trailing edge in the sense of the flow of the rotating mixture thereacross, said leading edge being relatively close to said periphery and the trailing edge being at a greater distance from said periphery.

3. In an engine as set forth in claim 2, wherein there are three of said vanes.

4. In an engine as set forth in claim 2, wherein said vane means includes a deflector generally in said direction from said vanes, said deflector having an edge adjacent said periphery with the deflector extending from said edge in a direction such that is approximately radial with respect to said crankshaft.

5. In an engine as set forth in claim 1, wherein said vane means includes a deflector at the trailing side thereof in the sense of the flow of the rotating mixture in the crankcase, said deflector having an edge closest to said crankshaft with the deflector extending from said edge in a direction such that is approximately radial with respect to said crankshaft.

6. A vane device for use with a two-cycle gasoline engine comprising an engine body, a cylinder in the body and having a closed end and an open end, an enclosed crankcase in the body and communicating with said open end, a crankshaft extending through the crankcase and rotatably mounted therein, a piston reciprocatively mounted in the cylinder, a connecting rod connecting the piston and the crankshaft, an intake duct in the body and communicating with the cylinder and through which a combustible mixture enters said cylinder when said piston is adjacent said closed end, said piston driving said mixture into said crankcase as said piston returns toward said open end, an exhaust duct in the body and communicating with the cylinder, said body defining a transfer duct extending between an intake port located immediately adjacent the crankcase and a discharge port located at about midway along the cylinder, the ports being located to be uncovered by the piston when the piston is at said open end whereby the mixture then flows from the crankcase through the transfer duct and into the cylinder, said crankshaft rotating in a given direction thereby causing the mixture in the crankcase to correspondingly rotate in the same direction, said transfer duct at the intake port end thereof having a given configuration, said vane device comprising:
a mounting portion generally corresponding to said given configuration and adapted to mate therewith; and
vane means integral with said mounting portion and extending therefrom into said crankcase for directing rotating mixture in the crankcase toward and into said intake port.

7. A vane device as set forth in claim 6, wherein said vane means including a plurality of individual vanes, each vane having a leading edge and a trailing edge in the sense of the flow of the rotating mixture thereacross, said leading edge being radially closest to said crankshaft and the trailing edge being further from said crankshaft.

8. A vane device as set forth in claim 7, wherein said vane means includes a deflector at the trailing side thereof in the sense of the flow of the rotating mixture in the crankcase, said deflector having an edge closest to said crankshaft with the deflector extending from said edge in a direction such that is approximately radial with respect to said crankshaft.

9. A method of improving the performance of a two-cycle gasoline engine which has a flywheel in the crankcase thereof, which flywheel causes the combustible mixture, being compressed by the piston in the crankcase before that mixture flows through the transfer duct to the cylinder, to rotate in the crankcase in the same direction as the flywheel is rotating, said method comprising the steps of:

skimming said mixture outwardly away from the periphery of the flywheel and directing the mixture so skimmed toward said duct.

* * * * *